United States Patent [19]

Hagenbach et al.

[11] 4,164,490

[45] Aug. 14, 1979

[54] BITUMEN COMPOSITIONS CONTAINING POLYMERS

[75] Inventors: Germain Hagenbach, Vernaison; Pierre Cazaux, Communay, both of France

[73] Assignee: Elf Union, Paris, France

[21] Appl. No.: 840,326

[22] Filed: Oct. 7, 1977

[30] Foreign Application Priority Data

Oct. 8, 1976 [FR] France ................. 76 30316

[51] Int. Cl.$^2$ ..................... C08K 5/01; C08L 95/00
[52] U.S. Cl. ................ 260/33.6 UA; 260/28.5 AS; 260/33.6 A
[58] Field of Search ............... 260/28.5 AS, 33.6 A, 260/33.6 UA

[56] References Cited

U.S. PATENT DOCUMENTS

| | | | |
|---|---|---|---|
| 3,790,519 | 2/1974 | Wahlborg | 260/285 AS |
| 3,879,323 | 4/1975 | Van Der Loos | 260/285 AS |

*Primary Examiner*—J. Ziegler
*Attorney, Agent, or Firm*—Burgess, Ryan and Wayne

[57] ABSTRACT

The invention is related to new bitumen compositions having improved rheological properties.

The compositions are characterized in that they contain:
- 90 to 99.9% in weight of a bitumen, its softening point being comprised between 20° and 120° C.,
- 0.1 to 10% in weight of a norbornene polymer, its average molecular weight being between 1,000,000 and 3,000,000.

The compositions of the invention are used particularly as superficial coats in road surfacing.

9 Claims, No Drawings

BITUMEN COMPOSITIONS CONTAINING POLYMERS

The present invention relates to novel compositions containing a bitumen which is modified by the addition of a norbornene polymer sometimes called polynorbornene rubber.

It is known that by adding natural rubbers to bitumen, bituminous binding agents having improved elasticity can be obtained. However these mixtures, whether they are hot or cold, are not homogeneous which greatly reduces their possible applications.

Separation of phases or formation of lumps also take place when synthetic rubbers such as nitrile rubbers, polybutadienes, styrene-butadiene static copolymers, polychloroprenes, butyl rubbers, poly-1-butenes or diene-ethylene copolymers such as EPDM are added to the bitumen.

It is known that thermoplastic rubbers consisting of styrene-butadienestyrene block copolymers are incorporable with bitumen provided that the bitumen has a softening point which is less than 63° C. and that its average molecular weight is less than 500,000. (French patent No. 1,557,193)

To be really effective, these copolymers must be added in large quantities often equal to 20% in weight of the total composition and sometimes more than this. Therefore the demixing problems are even greater.

The aim of the invention is to provide bitumen compositions having the desired rheological characteristics without the problems of compatibility.

The present invention is related to new bitumen compositions comprising 90 to 99.9% in weight of a bitumen having a penetration value comprised between 20 and 250 and 0.1 to 10% by weight of a norbornene polymer having a high average molecular weight, usually between 1,000,000 and 3,000,000.

In the present description the term bitumen is intended to cover for example any of the following products:

atmospheric and/or vacuum distillation residues of crude oil, solvent (such as propane, butane or pentane) extraction residues of crude oil, bitumen resulting from the oxidization by air blowing of a heavy petroleum cut possibly mixed with a vacuum residue.

Norbornene polymer is usually obtained by norbornene or bicyclo2,2,1 heptene-2 catalytic polymerization. This polymerization takes place after the opening of the cycle and the polymer obtained presents the following type of schematic structure:

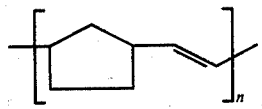

This polymerization gives rise to norbornene polymers with very high average molecular weight for example higher than 2,000,000 in weight and usually between 1,000,000 and 3,000,000 in weight.

Such a type of polymer is marketed by the French company CDF-Chimie under the registered trademark of NORSOREX.

In spite of their very high molecular weight, the norbornene polymers used for the manufacture of the composition according to the present invention have the advantage of being incorporable with all bitumens regardless of their softening points; this incorporation may take place either by direct solubilization of the pure polymer in the bitumen at temperatures usually comprised between 150° and 250° C., or by prior solubilization of the polymer in a heavy petroleum cut and addition of the resulting mixture to bitumen at a temperature between 150° and 250° C.

The non bituminous heavy petroleum cut to be used for the manufacture of the composition according to the present invention may be kerosene or an aromatic extract obtained by extraction with a solvent.

The quantity of polymer to be added to the bitumen for making the composition according to the present invention is usually between 0.1 and 10%. However one of the advantages of the invention is to be able to obtain modified bitumen compositions having interesting properties, especially considerable elasticity, with a low content of polymers, generally lower than 5%, for example between 0.5 and 2% in weight. Moreover the use of small quantities of polymers are an economic advantage since the price of the polymer is usually ten times that of bitumen.

Another advantage of the present invention resides in the fact that, due to the small quantities of polymer used in the formulations, there is not a very high elevation of the softening point of the initial bitumens. The presence of the polymer does not promote the elevation of the cold breaking or Fraass point of the bitumen. In other words although the polymer has a favourable influence upon the softening and breaking points, it is in fact the choice of bitumen or bituminous formulation which determines the plasticity interval of the finished product (the difference of temperature between the Fraass point and the softening point measured by the Ring and Ball test) whereas the addition of the polymer mainly determines the elastic properties of the finished product.

The bitumen used in the composition according to the present invention is usually characterized by its softening point which is measured according to the French Standard NFT 66-008 and expressed in °C.

The bitumen used is chosen from a very wide range of bitumens, the softening point of which is comprised between 20° C. and 120° C. in function of the later use of the said composition.

The products such as those obtained according to the present invention present a strong elasticity and a high plasticity interval and lead to specific interesting results when they are used in road building and industrial coating (coatings, superficial coats, asphalt covers) or for industrial applications such as tightness (coverings, felts, shingles, paints, products for undercoating cars etc ...).

The following non limited examples show the effect of the incorporation of a polynorbornene type polymer in bituminous products.

EXAMPLE 1

This example illustrates the properties of the products obtained by addition of polynorbornene rubber to bitumens which have been obtained by vacuum distillation of a Safaniya crude stock.

The norbornene polymer has the following properties:

average molecular weight: about 2,000,000, vitreous transition temperature of the second order: 35° C.,
ash: less than 0.2%
volatile content: less than 0.5%.

The products are all prepared in the same manner: heating of the bitumen at 150° C., adding the powdered polymer, agitating the mixture for four hours at 150° C. The characteristics of the bitumens obtained are given in table I.

TABLE 1

| PRODUCTS | Initial Bitumen | 60/70 | 60/70 | 40/50 | 40/50 | 100/120 | 100/120 | 100/120 |
|---|---|---|---|---|---|---|---|---|
| | % of polymer in the mixture | 2% | 0 | 2% | 0 | 2% | 2.5% | 0 |
| CHARACTERISTICS | 1. Softening point (R and B, °C.) | 62 | 52 | 78 | 56 | 63 | 63 | 43 |
| | 2. Fraass point, °C. | −12 | −8 | −10 | −6 | −14 | −13 | −12 |
| | 3. Penetration value at 25° C. (1/10 mm) | 50 | 62 | 21 | 45 | 53 | 49 | 110 |
| | 4. Tensile characteristics (500 mm/mn) at 20° C. | | | | | | | |
| | Tensile strength threshold (bars) | 2.6 | 0.9 | 3 | 0.9 | 1.83 | 2 | 0.8 |
| | Threshold extension (%) | 30% | 10% | 30% | 10% | 30% | 40% | 10% |
| strength (bars) | Breaking tensile 1.96 | 0 | 2.6 | 0 | 1.2 | 1.87 | 0 | |
| | Breaking extension (%) | 680% | 180% | 650% | 150% | 700% | 620% | 210% |

The products obtained according to the process of the present example constitute excellent modified bitumens for use in road building either as binders for hot coating or as binders for superficial coats.

1. Softening point measured by the Ring and Ball test according to French Standard NFT 66008.
2. Fraass or breaking point measured according to British Standard IP 80/53.
3. Penetration value measured according to French Standard NFT 66004.
4. Rheological tensile characteristics according to French Standard NFT 46002.

EXAMPLE 2

This example illustrates the characteristics of the products obtained by the addition of polynorbornene rubber to blown bitumens having a softening point above 85° C.

The products are all prepared in the same manner: heating of the bitumen at 170° C., adding the powdered polymer, agitating the mixture for four hours at 170° C.

| | | |
|---|---|---|
| Initial bitumen | 90/40 | 90/40 |
| % of polymer in the mixture | 0 | 1 |
| Softening point (R and B, °C.) | 96° C. | 129° C. |
| Fraass point °C. | −18° C. | −21° C. |
| Penetration value at 25° C. (mm) | 3.6 | 2.4 |
| Tensile characteristics: (500 mm/mn) at 20° C. | | |
| Tensile strength threshold (bars) | 3.85 | 3.5 |
| Threshold extension | 15% | 35% |
| Breaking tensile strength (bars) | 1.5 | 1.6 |
| Breaking extension | 70% | 180% |

The product obtained in this example constitutes an excellent modified bitumen for prefabricated tightness elements such as coating, bituminous felt, shingles and in general all the products for roof coverings and impermeabilization.

EXAMPLE 3

The initial bitumen used in this example is a mixture of 180/220 distillation bitumen and 90/40 oxidized bitumen. The operating conditions for preparing the products are identical to those described in example 2.

The characteristics of the products obtained are given in table II.

TABLE II

| Bitumen Composition | Distillation Bitumen Type | 180/220 | 180/220 | 180/220 |
|---|---|---|---|---|
| | % in the mixture | 50 | 49.5 | 49 |
| | Oxidized Bitumen Type | 90/40 | 90/40 | 90/40 |
| | % in the mixture | 50 | 49.5 | 49 |
| | % of polymer in the mixture | 0 | 1 | 2 |
| Bitumen Characteristics | Softening point (R and B,°C.) | 52 | 62 | 71 |
| | Fraass point °C | −11 | −15 | −18 |
| | Penetration value at 25°C. (mm) | 10.3 | 6.6 | 6.4 |
| | Tensile characteristics 500mm/mn at 25°C. | | | |
| | Tensile strength threshold (bars) | 1 | 2.3 | 2.5 |
| | Threshold extension % | 10% | 30% | 40% |
| | Breaking tensile strength (bars) | 0 | 1.5 | 1.8 |
| | Breaking extension % | 180% | 700% | 750% |

EXAMPLE 4

In this example a master batch of polynorbornene is formed in a heavy petroleum cut such as:

kerosene, an aromatic extract; it is formed from the fraction produced by treating vacuum distillates and deasphalted vacuum residues with solvents selective with respect to aromatic compositions such as for example furfurol.

In 70 g of aromatic extracts heated at 150° C. about 30 g of polynorbornene rubber are added progressively and under agitation. The agitation is continued for three hours at 150° C. until a viscous and perfectly homogenous product is obtained which will be termed from hence onwards "master batch".

20 g of this master batch is added to 80 g of 90/40 bitumen described in example 2, heated at 150° C. The mixture is agitated at 180° C. for about 10 mn. A bituminous composition is obtained which contains 6% in weight of polymer the characteristics of which are the following:

| | |
|---|---|
| Penetration value at 25° C. (mm) | 7.7 |
| Softening point (R and B,°C.) | 75° C. |
| Fraass point, °C. | −30° C. |
| Tensile characteristics: 500mm/mn, at 20° C. | |
| Tensile strength threshold (bars) | 2.5 |
| Threshold extension (%) | 50% |
| Breaking tensile strength (bars) | 1.7 |
| Breaking extension (%) | 930% |

What is claimed is:

1. Bitumen compositions comprising 90 to 99.9% by weight of a bitumen, the softening point of which is between 2° and 120° C., and 0.1 to 10% by weight of a norbornene homopolymer having an average molecular weight between 1,000,000 and 3,000,000.

2. Bitumen compositions according to claim 1 comprising 0.1 to 5% by weight of norbornene homopolymer.

3. Bitumen compositions according to claim 2 comprising 0.5 to 2% by weight of norbornene homopolymer.

4. Method of preparing the bitumen compositions according to claim 1 comprising dissolving the norbornene homopolymer in the bitumen at a temperature between 150° and 250° C.

5. Method of preparing the bitumen compositions according to claim 1 comprising dissolving the norbornene homopolymer in a heavy petroleum cut and then mixing the resulting solution with the bitumen at a temperature between 150° and 250° C.

6. Bitumen compositions according to claim 1 wherein the average molecular weight of the norbornene polymer is about 2,000,000.

7. Bitumen compositions according to claim 1 wherein said bitumen is a vacuum or atmospheric distillation residue of crude oil, an oxidized petroleum cut or mixture of said vacuum residue and said oxidized cut.

8. Method of preparing bitumen compositions according to claim 5 wherein said heavy petroleum cut is aromatic extracts.

9. Method of preparing bitumen compositions according to claim 5 wherein said heavy petroleum cut is kerosene.

* * * * *

UNITED STATES PATENT AND TRADEMARK OFFICE
CERTIFICATE OF CORRECTION

PATENT NO. : 4,164,490

DATED : August 14, 1979

INVENTOR(S) : Germain Hagenbach, et al

It is certified that error appears in the above—identified patent and that said Letters Patent is hereby corrected as shown below:

Column 3, Table 1, 3rd line from bottom: "strength bars" should be directly underneath "Breaking tensile", and all the numbers should be moved one column to the right.

Column 4, Table II, line 6: "% in the mixture" should be directly under "Type" (in line 5), and all numbers should be moved one column to the right.

Signed and Sealed this

Fourth Day of March 1980

[SEAL]

Attest:

SIDNEY A. DIAMOND

Attesting Officer

Commissioner of Patents and Trademarks